April 25, 1967
H. M. RICH
3,315,480
CRYOGENIC METHOD AND APPARATUS FOR QUICK FREEZING
Filed Oct. 27, 1964
2 Sheets-Sheet 1
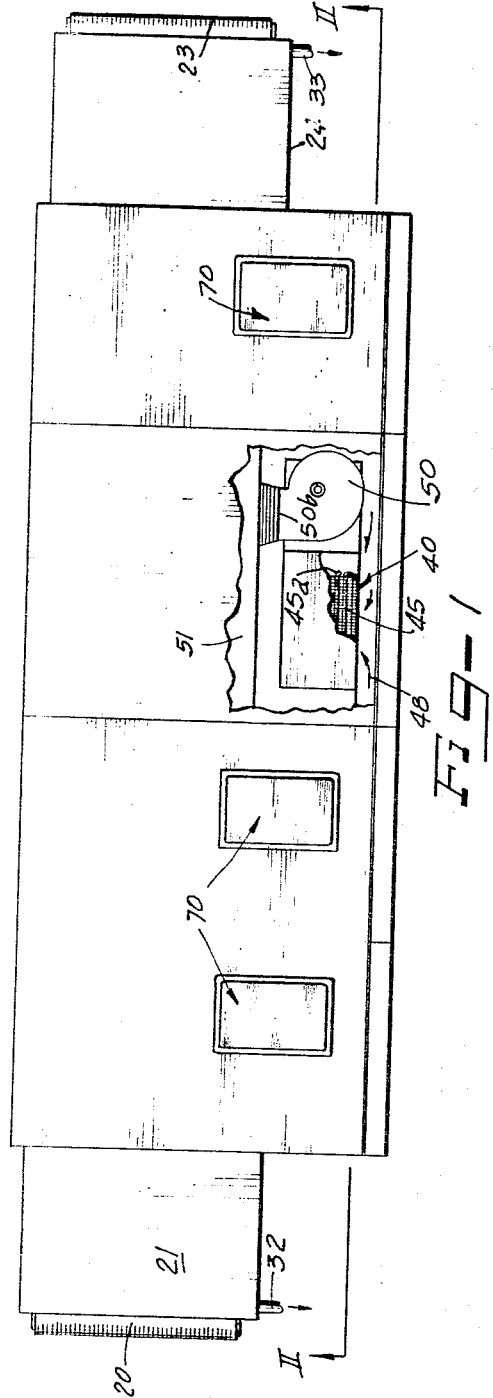
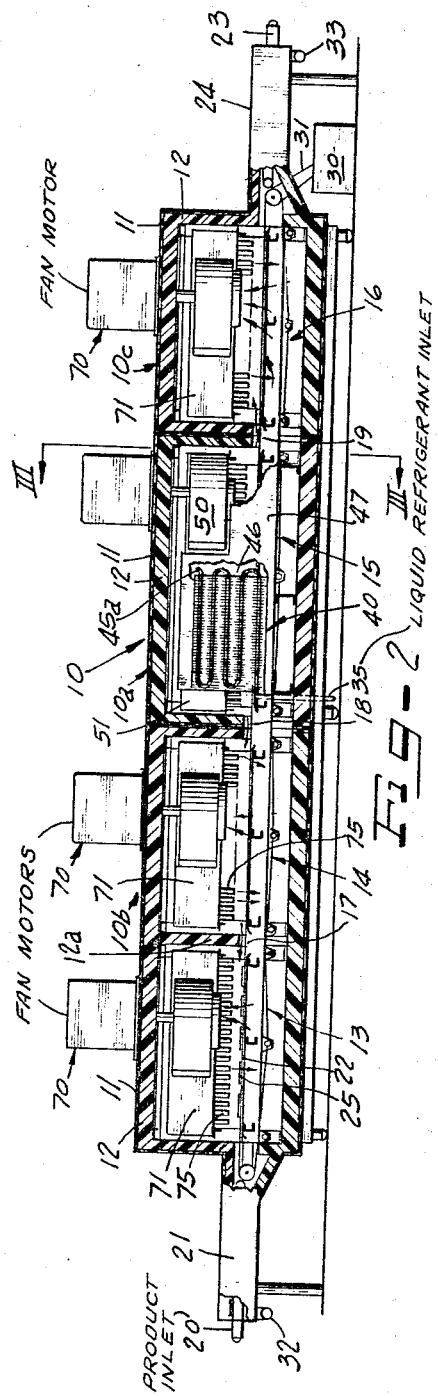
INVENTOR.
HAROLD M. RICH
ATTORNEYS April 25, 1967

H. M. RICH 3,315,480

CRYOGENIC METHOD AND APPARATUS FOR QUICK FREEZING

Filed Oct. 27, 1964

INVENTOR.
HAROLD M. RICH

BY
ATTORNEYS even pressure is
readily attainable but
that values much in excess of that figure are considered
unrealistic. It will be seen, accordingly, that under such
systems, an efficiency approximately only sixty percent

United States Patent Office 3,315,480
Patented Apr. 25, 1967

3,315,480
**CRYOGENIC METHOD AND APPARATUS
FOR QUICK FREEZING**
Harold M. Rich, Northbrook, Ill., assignor, by mesne assignments, to Chemetron Corporation, Chicago, Ill., a corporation of Delaware
Filed Oct. 27, 1964, Ser. No. 406,795
22 Claims. (Cl. 62—63)

The present invention relates to the quick freezing of food products and, more particularly, is concerned with the provision of a substantially improved method and apparatus for quick-freezing foods by the application of cryogenic fluids for the freezing operation.

As those skilled in the field of processing foods by means of extremely rapid freezing are aware, great progress has been made in recent years in the use of cryogenic fluids, such as for example, liquid nitrogen. Much research work has been done in the food freezing industry in an effort to economically quick-freeze foods by the use of liquid nitrogen as the cryogen. Apparatus thus far proposed for the use of liquid nitrogen includes devices arranged to immerse the product to be frozen in a pool of liquid nitrogen and/or to subject the product to a spray, directed at the product from above or below such that liquid nitrogen at substantially atmospheric pressure is in direct contact with the product. These systems have provided extremely rapid freezing of food products. In fact, they have reduced the freezing time from a matter of hours to as little as a few minutes, thereby permitting the quick-freezing of food products such as tomatoes, celery, and the like, with sufficiently small ice crystals to avoid physical damage to the product.

The extremely rapid freezing permitted by such immersion or spraying systems has been examined with great interest by those food processors concerned with premium quality. At present, the cost of liquid nitrogen renders the expense of quick-freezing by liquid nitrogen greater than the cost of freezing by conventional refrigeration systems. However, the high quality of the food product, and the extremely rapid speed of processing, coupled with relatively small and compact processing apparatus, has caused exploration and use of cryogenic fluids for high quality processing. At the same time, however, the inherent cost of processing by the use of liquid nitrogen has caused continuous evaluation of different methods of utilizing the liquid nitrogen in the freezing process, in order to provide increased efficiency.

I have found, as a result of experimentation, that although the quickest method of freezing a product ordinarily lies in the immersion of the product in a pool of liquid nitrogen, many products are unsuitable to immersion and, further, the over-all efficiency of immersion-freezing as practiced in the prior art, is relatively low. Liquid nitrogen at atmospheric pressure boils from a liquid to the vapor state at −320.3° F. The heat of vaporization of nitrogen is 85.21 B.t.u. per pound of liquid nitrogen and its specific heat is .248 B.t.u. per pound for each degree Fahrenheit over the range from the boiling point to ambient temperature. Thus, over the range of −320° F. to 0° F., in which a freezing process employing liquid nitrogen would preferably operate, the available total cooling would comprise the heat of vaporization of 85.2 B.t.u. per pounds plus a total sensible heat of 80 B.t.u. per pound, thus providing a total of 165 B.t.u. per pound of nitrogen. Statements in the published literature discussing immersion systems suggest that the successful utilization of 100 B.t.u. per pound of liquid nitrogen by immersion-type cooling systems is readily attainable but that values much in excess of that figure are considered unrealistic. It will be seen, accordingly, that under such systems, an efficiency approximately only sixty percent of the possible efficiency has been achieved. Deficiencies existing in such immersion systems have been mainly in the difficulty of control of the freezing temperatures in various zones of the system and in the relatively inefficient mechanical systems required for satisfactory spraying of liquid nitrogen or for the handling for products through liquid nitrogen.

In accordance with the present invention, an unusually efficient system is provided having substantially no structural components of a complicated nature. No mechanical apparatus in the nature of immersion tanks and related complicated conveyor equipment is employed for handling liquid nitrogen. Further, no conveyor equipment or other mechanical components are in any way directly placed in contact with liquid nitrogen. Instead, in accordance with the present system food or other material to be quick-frozen is conveyed on a continuous perforate conveyor which takes a substantially continuously horizontal path of movement through a series of cooling chambers. A nitrogen gas atmosphere is provided throughout the travel of the food through the freezer system. Gaseous nitrogen at atmospheric pressure is evaporated from a body of liquid nitrogen by way of heat transfer contact with nitrogen gas which has passed over, and is recirculated over, the food product being frozen. Liquid nitrogen is not brought in direct contact with any product during the freezing thereof, but is, instead, evaporated in a controlled manner to the form of a gas which is continuously circulated over and directed against the food product at extremely high velocities.

As a result of this system, the food product is cooled in an extremely rapid manner in an inert atmosphere such that the food product is continuously wiped by a fast moving current of nitrogen gas. As a result of the structural arrangement of a multitude number of cooling zones interconnected by a flow path of nitrogen gas continuously recirculating in contact with the food material, substantially every B.t.u. transferable to the cryogen is wiped away from the food material and substantially no cooling capacity of the cryogen is lost. By eliminating high velocity movement of liquid or, for that matter, the physical handling of liquids in any form, a very simple mechanical structure is possible and a minimum of work is performed upon the cryogen. Substantially the only heat applied to the system during the cooling operation is the heat energy applied to the circulating nitrogen gas by means of mechanical fans arranged to circulate the nitrogen gas at high velocity throughout the cooling zones, the energy applied by the conveyor and the small heat leakage through the insulation of the freezer housing walls.

As above noted, the entire atmosphere filling the freezing apparatus comprises the cryogen, which is, in the illustrated form of the invention, nitrogen. The nitrogen forming the atmosphere of the freezing apparatus is all introduced into the system of the present invention in the form of liquid nitrogen which is evaporated in the apparatus by the addition of heat taken from the product being frozen. The liquid density of nitrogen at its boiling point of −320.3° F. under atmospheric pressure, is 50.46 pounds per cubic foot. However, the density of gaseous nitrogen at 32° F. is .078 pound per cubic foot. Accordingly, it will be seen that each cubic foot of liquid nitrogen introduced into the system will produce approximately 650 cubic feet of gas as it leaves the refrigeration system. The gas continuously expands as it absorbs heat from the product, from an initial volume of approximately 175 cubic feet, per cubic foot of liquid at the initial point of boiling. Accordingly, as liquid nitrogen is heated by continuous recirculation in contact with the product being frozen, the expansion of the gas provides a continuous force tending to move the gas toward the open inlet and exit of the refrigeration apparatus.

As the gaseous nitrogen leaves the apparatus, it mingles with the adjacent atmosphere and is dispersed. Alternatively, fans may be employed to move the nitrogen gas to a remote location for further use. In this connection, an example of such use comprises passing it over the condenser system of a plant air conditioner.

In accordance with the present invention, an open-ended heat transfer coil is provided. This coil is supplied with liquid nitrogen at substantially atmospheric pressure from a source of supply at around 2 to 8 pounds of pressure. A fan is provided for moving gaseous nitrogen over the coil and directing the gaseous nitrogen thus circulated over the coil directly against the product to be frozen at an extremely high velocity. This velocity, which is preferably on the order of 6.000 to 7,000 feet per minute, causes a wiping scrubbing action in its co-operation with the product which has been found to provide an extremely efficient heat transfer from the product to the nitrogen gas. As the gaseous nitrogen transfers its heat to the liquid nitrogen in the coil, the liquid therein boils, at a temperature of −320° F. and the gaseous nitrogen thus formed is commingled with the nitrogen circulated by the fan and is projected against the product. Due to the tremendous expansion of the nitrogen, with increasing temperature, the nitrogen gas tends to pass from the freezing compartment in which it is evaporated, along the conveyor in both directions. Dampers are employed to cause a major portion of the expanding gas to pass upstream of the conveyor into one or more pre-cooling compartments. Each of these compartments is provided with a fan and high velocity structure for circulating gaseous nitrogen received from the main freezing compartment into high velocity direct contact with the product prior to the continuous movement of the product into the main freezing compartment. In each of the precooling compartments the gaseous nitrogen is recirculated many times and as a result of this recirculation and upstream movement of the gaseous nitrogen relative to the conveyor, the temperature of the gaseous nitrogen escaping from the entrance of the refrigerating apparatus is around −20° F. or above and approaches the temperature of the ambient air surrounding the refrigeration system as possible. The portion of the expanding nitrogen gas that is moved downstream of the conveyor tempers the freezing product and preferably leaves the refrigeration system at a temperature in the neighborhood of −10° F. which approximates the surface temperature of the frozen product at that point.

It is, accordingly, an object of the present invention to provide a substantially improved cryogenic quick-freezing apparatus and method of quick-freezing foods or the like.

Another object of the present invention is to provide an extremely efficient freezer employing liquid nitrogen.

A feature of the invention resides in the employment of extremely high velocity circulation of low temperature nitrogen gas over product to be quick-frozen.

A further feature of the invention comprises employment of a continuous freezer adapted to freeze products passed therethrough on a continuous conveyor by means of a multiple zone freezer system deriving the cryogenic material in all zones from an initial deep freezing zone.

Still another feature of the invention resides in the utilization of jet action movement of extremely low temperature nitrogen gas or other cryogenic material directly against, over, under and around, the product to be frozen.

Still another object of the invention is to provide a freezing apparatus employing an extremely low temperature refrigerant without placing the refrigerant in its liquid form in contact with the product being frozen.

Still other and further objects and features of the invention will at once become apparent to those skilled in the art from a consideration of the attached drawings and descriptive specification, wherein a preferred embodiment of the invention is shown by way of illustration only, and wherein:

FIGURE 1 is a plan view, partially broken away, of a freezer constructed in accordance with the present invention;

FIGURE 2 is a side elevational view in partial cross-section taken along the lines generally indicated at II—II of FIGURE 1;

As shown on the drawings:

Figure 3:
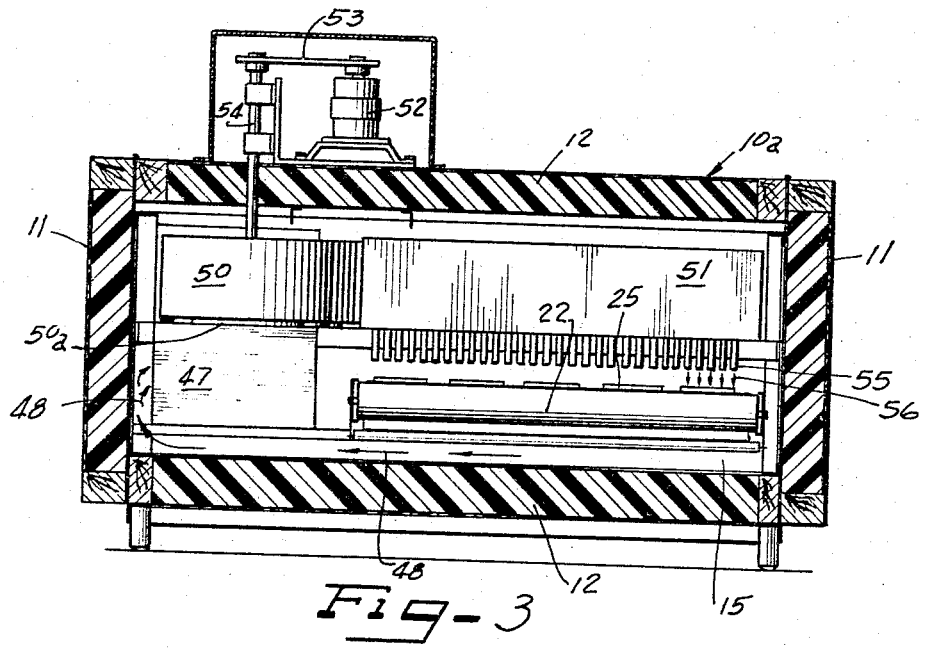
FIGURE 3 is a cross-sectional view of the freezer apparatus shown in FIGURES 1 and 2 taken along the line III—III of FIGURE 2.

As may be seen from a consideration of the drawings, a preferred embodiment of the invention comprises a freezer generally indicated at 10. The freezer as illustrated comprises a multiplicity of sections 10a, 10b, and 10c, each of which is provided with an external surface composed of a rigid insulating material such as for example, reinforced Fiberglas indicated at 11, covering a base of substantially rigid insulating material, such as, for example, polyurethane foam as shown at 12. Sections 10a, 10b, and 10c are constructed as sections for con'venience' sake but it will be understood that the entire system, comprising all three sections as illustrated, may be constructed as a single housing unit provided with separating insulating wall baffles as at 12a.

As can be seen from FIGURE 2, utilization of the sectional form of freezer zone construction provides a double baffle construction between the section 10a and sections 10b and 10c. This is desirable since, as will be described more fully below, section 10a comprises a section of extreme cold and maximum insulation protection must be provided for that section. As shown, a chamber 15 is provided within section 10a, chambers 13 and 14 are provided within the section 10b, and chamber 16 is provided within section 10c. Each of these chambers is connected to the next succeeding chamber by way of an opening in the wall baffle between chambers, as shown at 17, 18, and 19, in FIGURE 2.

Product to be quick-frozen is introduced at the loading conveyor 20 horizontally disposed within the entry tunnel extension 21. The product then travels along conveyor 22 through chambers 13, 14, 15 and 16 and from thence transfers to delivery conveyor 23 mounted for movement in the exit tunnel 24. The food product or the like to be quick-frozen, accordingly, travels from conveyor 20 to conveyor 22 and out of the freezer by way of conveyor 23 to conventional shipping or packaging equipment. Power for driving the conveyors 20, 22, and 23 may be derived from any conventional power source, such as for example variable speed electric motor source 30 connected to the conveyor 22 by way of a drive belt 31. In this connection it is preferable that the conveyors 20, 22, and 23 be synchronized as to linear rate of movement and they may, accordingly, be drivingly connected directly to the same source of power.

As a result of the construction above noted, no circulation of air or other foreign contaminant from the ambient atmosphere is permitted except the possible movement of such constituents inwardly of the entrance and exit tunnels 21 and 24, respectively, with the passage of the product. Such movement of air inwardly is prevented, however, in the operation of the device by a continuous build-up of positive pressure within the freezer system. This positive pressure tends to move gaseous refrigerant or cryogen outwardly through both the entrance and exit tunnels to atmosphere. In order to assure that the flow is properly distributed to atmosphere, ducts 32 and 33 are employed to convey the gaseous refrigerant appearing at the entrance and exit away from the freezer apparatus.

Liquid refrigerant, or cryogen, is introduced into the freezer by way of a conduit 35 which is connected to any convenient source of supply, preferably in the form of a storage container positioned adjacent the freezer. The liquid passes through a control valve 36 actuated by electrical solenoids 37 and 38, and from thence into a heat transfer coil generally indicated at 40. The liquid refrigerant is maintained at a level generally indicated at 41 in the coil by a limit switch 42 of any conventional construction which is responsive to lowering of the level 41 below the bottom control position 43 to cause solenoid 38 to open valve 36, and responsive to upward movement of the level 41 to the position 44 to close switch 36. In practice, it is preferred that the solenoid 38 be normally biased into the valve-closed condition and energized into the valve-open condition by falling of the level 41 to the position 43.

Figure 4:
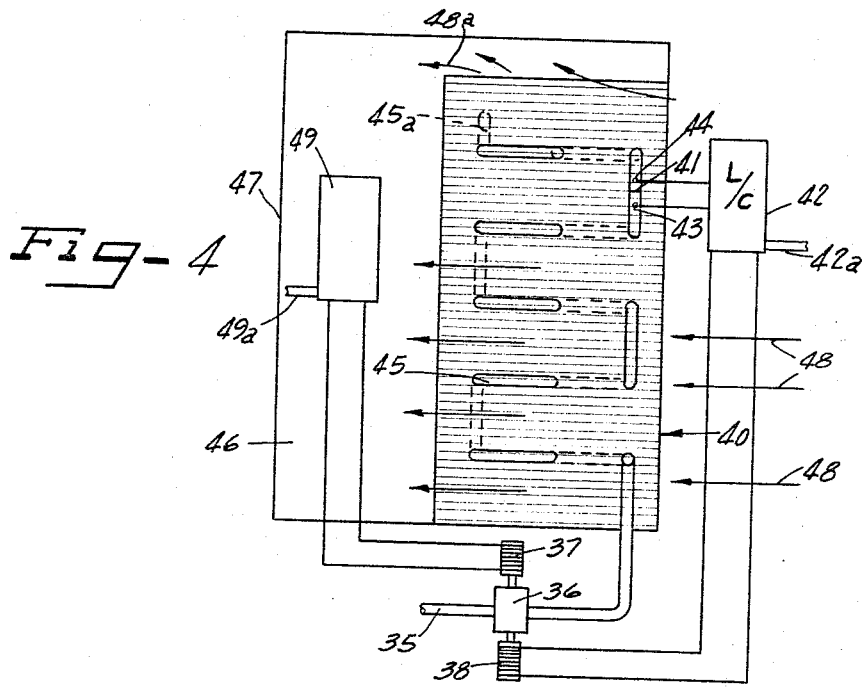
FIGURE 4 is a schematic diagram illustrating the cryogen control system employed in accordance with the present invention.

Coil tube 45 is open at its upper end 45a to the area 46 within the chamber 47. The coil 40 is open at its side facing the viewer in FIGURE 2 and on the right-hand side as viewed in FIGURE 4. Gas refrigerant in chamber 15 of section 10a flows from beneath the conveyor 22 as indicated by the arrows 48 and passes through the coil 40 transferring heat to the coil tube 45. The gas passes to chamber 46 where it commingles with the refrigerant evaporating from open end 45a of tube 45, as indicated at 48a. While the liquid level control provides a temperature affected control on the system, an auxiliary temperature control may be employed. Thus, temperature control 49 of any conventional construction is arranged to control valve 36 by means of the solenoid 37 should the temperature in chamber 46 reach a predetermined temperature. In the case of a cryogen such as nitrogen it is preferred that the temperature at which the solenoid energizes to open valve 36 comprise approximately −300° F. At conditions of temperature below −300° F. the solenoid 37 is biased by a conventional spring or the like into a condition in which the valve 36 is closed. It will be observed that power for actuation of solenoids 37 and 38, under the control of units 49 and 42, respectively, may be supplied by any convenient power source by respective cables 49a and 42a.

Gaseous cryogenic fluid in chamber 46 continuously expands as it is heated. This expansion, coupled with the suction provided by a fan 50 causes the gaseous nitrogen to move from chamber 46 into a positive pressure plenum chamber 51 by way of fan inlet 50a and fan outlet 50b. The fan 50 is driven at a high rate of speed by an electrical motor 52 and a transmission belt 53 which rotates fan shaft 54. The gas under pressure in plenum chamber 51 is directly downwardly via slots, or tubular jet nozzles 55, as indicated by the air flow arrows 56, against and around the product 25 carried by the conveyor 22. The gas passes through conveyor 22 downwardly and laterally along the bottom of the chamber 15 in the direction of the arrows 48 for recirculation through the coil 40 and thence back into plenum chamber 51 and nozzles 55.

In studies made prior to my developments, it was generally considered that effective freezing speed increased, step by step, with an increase in velocity of the heat transfer fluid over the body being treated, up to a plateau level beyond which increased flow velocity appeared to offer little increased freezing speed. In prior developments it was generally considered that 2,000 feet per minute velocity of a heat transfer gaseous medium provided a maximum heat transfer efficiency. However, experimental work in the field of cryogenic fluids has shown that although plateaus of rate of freezing are reached with increasing increments of fluid velocity, nevertheless very substantially improved freezing times are actually achievable with extremely high velocities, on the order of 6,000 feet to 7,000 feet per minute. Accordingly, the fan 50 has a capacity and adjustable speed sufficient to provide a fluid velocity through the large number of slots or nozzles 55, as high as 7,000 feet per minute over the entire nozzle area comprising the bottom surface of plenum chamber 51 and the width of conveyor belt 22.

The high velocity operation of the fan 50 acts to provide rapid recirculation of nitrogen gas in the freezing compartment section 10a. In continuous operation of the system it has been found that this recirculation in the deep freezing compartment will provide a general operating temperature in the range of −280° F. to −250° F. Such a steady state condition is achieved by providing in addition to the deep freezing compartment 10a, the pre-cooling compartments 10b, which may be one or more in number, and a tempering section 10c. Nitrogen gas expands and moves both upstream and downstream of the general movement of the conveyor 22 by way of openings 18 and 19 respectively. Each of the fans 50 is provided with a damper, not shown, in its inlet 50a to control the amount of recycling of the nitrogen gas prior to movement thereof to the next adjacent chamber. If desired, the separating walls between chambers 13, 14, 15 and 16 may be provided with dampers in the openings 17, 18, and 19 to vary the movement of gas from one chamber to the next.

As a result of adjustment of the dampers controlling flow, the flow of nitrogen gas is controlled to provide a temperature approximating −250° F. escaping from chamber 15 of compartment 10a by way of openings 18 and 19. Each of the pre-cooling chambers, two being shown in the present embodiment at chambers 13 and 14 of section 10b, and the tempering chamber 16 is provided with substantially identical construction. This construction provides fans generally indicated in housings 70. These fans are substantially identical in construction to the fan 50 with its motor drive and each co-operates with a plenum chamber 71 having generally tubular jet nozzles 75 extending downwardly therefrom for jet movement of gaseous nitrogen against the product 25 being conveyed along conveyor 22. For simplicity of manufacture it is preferable that the fans 70 be identical and that the plenum chambers and nozzles employed throughout the apparatus similarly be identical. However, it will be apparent to those skilled in the field that the specific freezer installations may make it desirable to provide different sized fans, plenum chambers, and nozzles in the several chambers 13, 14, 15, and 16 to provide an absolute maximum of efficiency with a given product. Such changes are considered within the scope of this invention.

Experience indicates that the product is readily cooled from an entrance temperature of 50° F. at the conveyor 20 to a core temperature approximately 40° F. by passage through the initial pre-cooling chamber 13. The temperature of the gas in chamber 13 approximates −50° F. to 0° F. and the product is subjected to a gas velocity which is as high as possible, consistent with the texture of the product. It has been found that at gas velocities on the order of 2,000 feet per minute, liquid products may readily be cooled without splattering. However, as the velocity increases, products of a relatively low viscosity tend to splatter. It is desired that the gas velocity be maintained at the highest value at which no splattering occurs, up to a velocity of 6,000 feet to 7,000 feet per minute. If the product is of a generally solid state upon entering the freezer by way of conveyor 20, the maximum gas velocity of approximately 6,000 feet to 7,000 feet per minute may be employed.

As the product moves with conveyor 22 into the second pre-cooling chamber 14, the temperature of the recirculating gaseous nitrogen becomes considerably colder, approximating −50° F. to −200° F. The velocity of the gas leaving the nozzles above the conveyor will, again, be as great as possible, up to a maximum figure on the order of 7,000 feet per minute. In the case of low viscosity products of the type limiting the gas velocity to a value on the order of 2,000 feet per minute in section 13, it may be found that the gas velocity in section 14 may be increased somewhat, as the temperature of the part will have cooled by the time it reaches section 14. Although the amount of cooling is ordinarily relatively small, nevertheless viscosity changes over small ranges of temperature may provide sufficient resistance to splattering to permit increase in the velocity of the nitrogen gas in chamber 14 to a higher value. In any event, it is intended that the gas velocity be at its maximum possible value, consistent with non-splattering conditions, up to a value maximum approximating 7,000 feet per minute.

As the product passes through chamber 14 the core temperature of the product is preferably dropped from approximately 40° F. to a temperature approximating the freezing point of product. The nitrogen gas in chamber 14 recirculates from 3 to 12 times before it moves onward to section 13. The conveyor speed, the velocity of flow and amount of recycling of nitrogen gas, the amount of liquid nitrogen added to the system and the input temperature of the product and length of each cooling chamber all affect the equilibrium condition of the system. It will be understood, accordingly, that any one or all of these factors may be varied in a given freezer apparatus to provide a maximum recirculation of the gas refrigerant in each section relative to each component of product.

During passage of the product through chamber 15, the water in the product changes to ice and the product freezes hard. During passage of the product through chamber 15 the core temperature of the product reaches a temperature of approximately 0° F. with a surface temperature approximating that of the nitrogen gas circulated in the chamber, preferably in the range from −250° F. to −300° F. It is manifest that in operation of chamber 15 the velocity of the nitrogen gas directed through the jet nozzles against the product may be at a very high value, approaching 7,000 feet per minute, since the product is in an absolutely solid state.

As the product leaves chamber 15 and passes into the tempering chamber 16, the surface temperature rises to a temperature, at the exhaust, in the neighborhood of −10° F. or slightly below. At the same time, the temperature of the core of the product gradually falls to approximately the same temperature. By thus employing a small amount of the main nitrogen supply for tempering the product in a controlled manner, the freezing of the product in the deep freezing compartment 15 does not require the core temperature to be depressed way below its final desired figure and, accordingly, an efficient transition between deep freezing conditions and the desired final, stable, product temperature is achieved.

A consideration of the embodiment illustrated demonstrates that it is an extremely trouble-free apparatus having a minimum of heat transfer efficiency. The entire apparatus of the main conveyor 22 is retained constantly within the confines of the system while only short terminal conveyors 22 and 23 have any portion thereof passing into the area surrounding the freezing apparatus. The entire freezer apparatus is extremely compact and will, in an ordinary system calculated to provide a production rate on the order of 60 units per minute with a total heat requirement of 100 B.t.u., encompass a total length of approximately 30 feet. Operating at 100% efficiency this would provide a total volume of gas at the exhausts of about 480 cubic feet per minute and at 90% efficiency of about 530 cubic feet per minute. The apparatus is of sufficiently simple construction to permit addition of further pre-cooling and/or freezer tempering sections should it become necessary with certain products to increase the conveyor speed and/or operate the blowers at a speed providing a jet velocity substantially less than the preferred high value of approximately 6,000 to 7,000 feet per minute. Due to the construction of the system, substantially the only heat losses comprise the mechanical energy imparted to the system by the fans and by the conveyor. These quantities are quite low and over-all efficiencies of heat transfer and nitrogen utilization of the present system are on the order of 90%.

In the embodiment of the invention illustrated, the conveyor belt 22 is preferably perforated. Perforation of the conveyor belt permits flow of the cryogenic gas intimately around the product being frozen in an efficient manner. However, it will be understood that the belt may be constructed of an imperforate material if so desired. The physical nature of the product being frozen may well dictate that the belt have a substantially continuous, unbroken, surface. It is considered within the scope of the present invention to employ the belt 22 composed of a basic layer of perforate material to which may be temporarily secured a cover of imperforate material for utilization of the freezer in situations where the imperforate construction is desirable. Of course, in situations where a particular freezer is specifically designed to handle only product for which imperforate belting is necessary, the basic belt 22 may be constructed of imperforate material.

In addition to variations in specific belt construction, it will be understood that the freezer of the present invention may be modified to provide dual systems of jet nozzles to direct the cryogenic gas vertically upwardly as well as verticaly downwardly from a combined plenum chamber, with the gas passing transversely of the conveyor in its recirculation pattern. In such a system, the nozzles directing nitrogen gas upwardly could be used simultaneously, or in timed relation, with the jets directing the cryogenic gas downwardly. Such dual flow direction has particularly advantageous utility with relatively thin products composed of materials having poor heat conductivity. Such an arrangement may, more specifically, be provided, by modifying the structure as illustrated in FIGURE 3 to extend the plenum chamber 51 downwardly at its right end and backwardly under the conveyor 22 to a point approximately at the left-hand side of the conveyor 22. Additional nozzles 55 may then be provided directing gas from such an extended plenum chamber vertically upwardly in direction opposite to the nozzle direction of nozzles 55 illustrated. Gas leaving all of the nozzles would then pass laterally to the left in the same manner as illustrated in FIGURE 3 of the embodiment illustrated, for recirculation by the fan 50.

In the embodiment illustrated, the recirculating cryogenic gas passes over coil 40. A film or spray of liquid nitrogen may be substituted for the coil, to provide evaporation of the liquid for passage through the jet nozzles. It has been found, however, that an efficient coil 40 incorporated into the system as illustrated provides an extremely efficient freezer system.

As those familiar with the art of freezing are aware, it is possible to provide a fluidized bed construction in which no movable conveyor is employed. In such a construction the cryogenic gas is forced upwardly, and at a slight angle longitudinally of the freezer to actually support the product and cause it to move in the direction of gas flow. The present apparatus may readily be adapted to such a fluidized bed operation, which is particularly useful for freezing small solid objects, by immobilizing the conveyor 22 and providing nozzles 55 below the belt directed vertically upwardly and angled slightly downstream as viewed in FIGURE 2. Alternately, the conveyor belt 22 may be completely replaced with a solid grid having upwardly slanting apertures therethrough, over which the product is moved directly by supporting contact with the cryogenic fluid flowing upwardly from a plenum chamber below the grid. Of course, the control and recirculation of the cryogenic material would be, in such an installation, the same as specifically described in the above description concerning the illustrated embodiment of FIGURES 1 and 2.

In the embodiment illustrated, the exhaust ducts 32 and 33 are shown without auxiliary fans or other devices for aiding in the movement of cryogenic gaseous material leaving the freezer. It will, of course, be obvious to those skilled in the art after a consideration of the apparatus illustrated, that exhaust fans may be installed in the exhausts 32 and 33 if desired.

It will, accordingly, be seen that I have provided an extremely efficient freezer system which will freeze food products or like materials efficiently and extremely rapidly. The system while illustrated as providing a finished, frozen, product ready for packaging, may also be employed as a first stage in a freeze-drying process and apparatus. In such an installation, the product leaving chamber 16 is subjected to a vacuum to lower the product to the triple point of water, namely a pressure approximating .46 centimeter of mercury and the temperature of $+.0075°$ C. at which condition the frozen water in the product sublimates and the product is dehydrated.

In view of the obvious modifications described above, and the many uses to which the efficient of the present invention may be put, it is my intention that the scope of the present invention be limited solely by that of the hereinafter appended claims.

I claim as my invention:

1. The method of providing an efficient low temperature quick-freezing atmosphere for cooling and quick-freezing a continuously moving product to be frozen, comprising providing a source of liquid cryogen at atmospheric pressure, passing a current of gaseous form of said cryogen in heat transfer relation to said liquid to progressively evaporate said liquid by the addition of heat thereto, directing the thus evaporated cryogen in its gaseous form into said current and forcing the combined current against said product in a jet stream and forcibly recirculating the gaseous form of said cryogen leaving said product into heat transfer relation with said liquid cryogen.

2. The method of providing an efficient low temperature quick-freezing atmosphere for cooling and quick-freezing a continuously moving product to be frozen, comprising providing a source of liquid cryogen at atmospheric pressure, passing a current of gaseous form of said cryogen in heat transfer relation to said liquid to progressively evaporate said liquid by the addition of heat thereto, directing the thus evaporated cryogen in its gaseous form into said current and forcing the combined current against said product in a jet stream, and forcibly recirculating the gaseous form of said cryogen leaving said product into heat transfer relation with said liquid cryogen, and simultaneously directing a portion of the gaseous cryogen upstream of the movement of said product for pre-cooling said product.

3. The method of providing an efficient low temperature quick-freezing atmosphere for cooling and quick-freezing a continuously moving product to be frozen, comprising providing a source of liquid cryogen at atmospheric pressure, passing a current of gaseous form of said cryogen in heat transfer relation to said liquid to progressively evaporate said liquid by the addition of heat thereto, directing the thus evaporated cryogen in its gaseous form into said current and forcing the combined current against said product in a jet stream, and forcibly recirculating the gaseous form of said cryogen leaving said product into heat transfer relation with said liquid cryogen, and simultaneously directing portions of the gaseous cryogen upstream of the movement of said product for pre-cooling said product and downstream for tempering said product.

4. The method of providing an efficient low temperature quick-freezing atmosphere for cooling and quick-freezing a continuously moving conveyor carrying product to be frozen, comprising providing a source of liquid cryogen at atmospheric pressure, passing a current of gaseous form of said cryogen in heat transfer relation to said liquid to progressively evaporate said liquid by the addition of heat thereto, directing the thus evaporated cryogen in its gaseous form into said current and forcing the combined current against said conveyor and product in a jet stream, and forcibly recirculating the gaseous form of said cryogen leaving said conveyor and product into heat transfer relation with said liquid cryogen.

5. The process of quick-freezing a product which comprises the steps of forcing a jet stream of gaseous nitrogen, having a temperature only slightly above the boiling temperature of liquid nitrogen at atmospheric pressure, at said product in an atmosphere of nitrogen, recirculating said gaseous nitrogen after contact with said product into heat transfer relation with a source of liquid nitrogen whereby said liquid nitrogen is evaporated, and commingling the gaseous nitrogen leaving said heat transfer relation with gaseous nitrogen released by the said heat transfer relationship and forcing said combination in the form of a high speed jet stream against said product.

6. The process of quick-freezing a product which comprises the steps of forcing a jet stream of gaseous nitrogen having a temperature only slightly above the boiling temperature of liquid nitrogen at atmospheric pressure, at said product in an atmosphere of nitrogen, recirculating said gaseous nitrogen after contact with said product into heat transfer relation with a source of liquid nitrogen whereby said liquid nitrogen is evaporated, and commingling the gaseous nitrogen leaving said heat transfer relation with gaseous nitrogen released by the heat transfer relationship, forcing a part of said combination against said product in a high speed jet stream and directing another portion of said gaseous nitrogen longitudinally upstream of said conveyor for precooling additional product.

7. Apparatus for quick-freezing a product, which comprises a longitudinally extending housing having openings at opposite ends thereof, a conveyor carrying said product through said housing by way of said openings, means insulating said housing against heat transfer between the inside and outside thereof, a freezing compartment in said housing through which said conveyor and product pass, a plenum chamber, flow directing means on said plenum chamber directing fluid in said plenum chamber against said product, a heat transfer coil, means directing a liquid form of cryogen into said coil, fan means for passing said cryogen in gaseous form in heat transfer relation with said coil to transfer heat therein to the liquid in said coil for the evaporation thereof means supplying gaseous cryogen to said fan means, means introducing the thus evaporated cryogen into said plenum chamber, means directing the gaseous cryogen passed in heat transfer relation with said coil into mixing relation with said evaporated cryogen in said plenum chamber and out through said flow directing means against said product.

8. Apparatus for quick-freezing a product which comprises a longitudinally extending housing having openings at opposite ends thereof, a conveyor carrying said product through said housing by way of said openings, means insulating said housing against heat transfer between the inside and outside thereof, a freezing compartment in said housing through which said conveyor and product pass, a plenum chamber, a plurality of nozzles connected to said plenum chamber and directed against said product, a heat transfer means, means directing a cryogen in liquid form into said heat transfer means, fan means for passing the gaseous form of said cryogen in heat transfer relation with said heat transfer means to transfer heat to the liquid in said heat transfer means for the evaporation thereof means supplying gaseous cryogen to said fan means, means introducing the thus evaporated cryogen into said plenum chamber, and means directing the gaseous cryogen passed in heat transfer relation with said heat transfer means into mixing relation with said evaporated cryogen in said plenum chamber and thence out through said nozzles against said product.

9. Apparatus for quick-freezing a product which comprises a longitudinal extending housing having openings at opposite ends thereof, a conveyor carrying said product through said housing by way of said openings, means insulating said housing against heat transfer between the inside and outside thereof, a freezing compartment in said housing through which said conveyor and product pass, a plenum chamber, a plurality of nozzles connected to said plenum chamber and directed against said product, a heat transfer coil, means directing a cryogen in liquid form into said coil, fan means for passing the gaseous form of said cryogen in heat transfer relation with said coil to transfer heat to the liquid in said coil for the evaporation thereof, means introducing the thus evaporated cryogen into said plenum chamber, means directing the gaseous cryogen passed in heat transfer relation with said coil into mixing relation with said evaporated cryogen in said plenum chamber and thence out through said nozzles against said product, and means directing the gaseous cryogen leaving said product at least in part upstream and downstream of said conveyor into pre-cooling and tempering contact respectively with the product in said conveyor and at least in part to said fan means.

10. Apparatus for quick-freezing food or like product which comprises a longitudinally extending housing having openings at opposite ends thereof, a conveyor carrying said product through said housing by way of said openings, means insulating said housing against heat transfer between the inside and outside thereof, a freezing compartment in said housing through which said conveyor and product pass, a plenum chamber, flow directing means connected to said plenum chamber directing fluid flow from said plenum chamber against said product in said freezing compartment, a heat transfer coil, means directing a cryogen in liquid form into said coil, fan means for passing the gaseous form of said cryogen in heat transfer relation with said coil to transfer heat to the liquid in said coil for the evaporation thereof, means introducing the thus evaporated cryogen into said plenum chamber, means directing the gaseous cryogen passed in heat transfer relation with said coil into mixing relation with said evaporated cryogen in said plenum chamber, thence out through said flow directing means against said product at flow velocities on the order of 6,000 feet per minute and then to the inlet of said fan means for recirculation thereby into heat transfer relation with said coil.

11. Apparatus for quick-freezing a product which comprises a longitudinally extending housing having openings at opposite ends thereof, a conveyor carrying said product through said housing by way of said openings, means insulating said housing against heat transfer between the inside and outside thereof, a freezing compartment in said housing through which said conveyor and product pass, a plenum chamber, a plurality of nozzles connected to said plenum chamber and directed against said product, a heat transfer coil, means directing a cryogen in liquid form into said coil, fan means for passing the gaseous form of said cryogen in heat transfer relation with said coil to transfer heat to the liquid in said coil for the evaporation thereof, means directing gaseous cryogen to said fan means from said freezing compartment means introducing the thus evaporated cryogen into said plenum chamber, means directing the gaseous cryogen passed in heat transfer relation with said coil into mixing relation with said evaporated cryogen, and means forcing a portion of said mixed gaseous cryogen through said plenum chamber and nozzles against said product at a high velocity and means directing a part of said gaseous cryogen leaving said product into circulation with said conveyor and product upstream of said freezing compartment.

12. Apparatus for quick-freezing a product which comprises a longitudinally extending housing having openings at opposite ends thereof, a conveyor carrying said product through said housing by way of said openings, means insulating said housing against heat transfer between the inside and outside thereof, a freezing compartment in said housing through which said conveyor and product pass, a plenum chamber, a plurality of nozzles connected to said plenum chamber and directed against said product, a heat transfer coil, means directing a cryogen in liquid form into said coil, fan means for passing the gaseous form of said cryogen in heat transfer relation with said coil to transfer heat to the liquid in said coil for the evaporation thereof, means directing gaseous cryogen to said fan means from said freezing compartment, means introducing the thus evaporated cryogen into said plenum chamber, means directing the gaseous cryogen passed in heat transfer relation with said coil into mixing relation with said evaporated cryogen, means forcing a portion of said mixed gaseous cryogen through said plenum chamber and nozzles against said product at a high velocity and means directing a part of said gaseous cryogen leaving said product into circulation with said conveyor and product upstream of said freezing compartment, and directing a further part thereof against said conveyor and product downstream of said freezing compartment.

13. Apparatus for quick-freezing a product which comprises a longitudinally extending housing having openings at opposite ends thereof, a conveyor carrying said product through said housing by way of said openings, means insulating said housing against heat transfer between the inside and outside thereof, a freezing compartment in said housing through which said conveyor and product pass, a plenum chamber, a plurality of nozzles connected to said plenum chamber and directed against said product, a heat transfer coil, means directing a cryogen in liquid form into said coil, fan means for passing the gaseous form of said cryogen in heat transfer relation with said coil to transfer heat to the liquid in said coil for the evaporation thereof, means directing gaseous cryogen to said fan means from said freezing compartment means introducing the thus evaporated cryogen into said plenum chamber, means directing the gaseous cryogen passed in heat transfer relation with said coil into mixing relation with said evaporated cryogen, means forcing a portion of said mixed gaseous cryogen through said plenum chamber and nozzles against said product at a high velocity and means directing a part of the gaseous cryogen leaving the product in said freezing compartment into circulation with said conveyor and product upstream of said freezing compartment, and a second fan, plenum chamber and nozzle located upstream of said freezing compartment for continuously recirculating said gaseous cryogen directed upstream of said freezing compartment in close high speed relation to said product prior to movement of said product into said freezing compartment.

14. Apparatus for quick-freezing a product which comprises a longitudinally extending housing having openings at opposite ends thereof, a conveyor carrying said product through said housing by way of said openings, means insulating said housing against heat transfer between the inside and outside thereof, a freezing compartment in said housing through which said conveyor and product pass, a plenum chamber in said freezing compartment, a plurality of nozzles connected to said plenum chamber and directed against said product, a heat transfer coil, means directing a cryogen in liquid form into said coil, fan means for passing the gaseous form of said cryogen in heat transfer relation with said coil to transfer heat to the liquid in said coil for the evaporation thereof, means directing gaseous cryogen to said fan means from said freezing compartment; means introducing the thus evaporated cryogen into said plenum chamber, means directing the gaseous cryogen passed in heat transfer relation with said coil into mixing relation with said evaporated cryogen, means forcing a portion of said mixed gaseous cryogen through said plenum chamber and nozzles against said product at a high velocity, means directing a part of the gaseous cryogen leaving the product in said freezing compartment into circulation with said conveyor and product upstream of said freezing compartment, a second fan, plenum chamber and nozzle located upstream of said freezing compartment for continuously recirculating said gaseous cryogen directed upstream of said freezing compartment in close high speed relation to said product prior to movement of said product into said freezing compartment, and a third fan, plenum chamber and nozzle compartment for continuously recirculating said gaseous cryogen directed downstream of said freezing compartment in close relation to said product at at high velocity on the order of 6,000 feet per minute subsequent to movement of said product from said freezing compartment.

15. Apparatus for quick-freezing a product, which comprises a longitudinally extending housing having openings at opposite ends thereof, means carrying said product through said housing by way of said openings, means insulating said housing against heat transfer between the inside and outside thereof, a freezing compartment in said housing through which said product passes, a plenum chamber, flow directing means on said plenum chamber directing fluid in said plenum chamber against said product, a heat transfer means, means directing a liquid form of cryogen into said heat transfer means, fan means for passing said cryogen in gaseous form in heat transfer relation with said heat transfer means to transfer heat therein to the liquid in said heat transfer means for the evaporation thereof, means supplying gaseous cryogen to said fan means, means introducing the thus evaporated cryogen into said plenum chamber, means directing the gaseous cryogen passed in heat transfer relation with said heat transfer means into mixing relation with said evaporated cryogen in said plenum chamber and out through said flow directing means against said product.

16. The apparatus set forth in claim 15 wherein said means supplying gaseous cryogen to said fan means comprises a connection between said freezing compartment and said fan means whereby gaseous cryogen is drawn to said fan means after contacting said product.

17. The apparatus as set forth in claim 15 wherein said fan means and flow-directing means force said fluid in said plenum chamber against said product at an extremely high velocity on the order of 6,000 feet per minute.

18. The method of quick freezing a product using a gaseous cryogen providing a low temperature quick-freezing atmosphere for cooling and quick-freezing a continuously moving product to be frozen which comprises providing a source of liquid cryogen at substantially atmospheric pressure, evaporating said liquid with heat absorbed from said product, circulating and recirculating in a freezing zone the evaporated cryogen in extremely high speed forced jet stream contact with said product at a velocity on the order of 6,000 feet per minute and at a temperature near the boiling point of nitrogen, and continuously forcibly circulating and recirculating the evaporated cryogen against the product upstream of said freezing zone.

19. The method set forth in claim 1 including the further step of directing a portion of the gaseous cryogen upstream of the movement of said product and forcibly there circulating and recirculating the gaseous cryogen against the product for pre-cooling the product.

20. The method set forth in claim 1 including the further step of directing portions of the gaseous cryogen upstream and downstream of the movement of said product and forcibly there circulating and recirculating the gaseous cryogen against the product for respectively pre-cooling and tempering the product.

21. The apparatus set forth in claim 15 including means directing a portion of said gaseous cryogen leaving said product upstream of said product and means forcibly there circulating and recirculating said portion of the gaseous cryogen against the product to pre-cool the product.

22. The apparatus set forth in claim 15 including means directing portions of said gaseous cryogen leaving said product respectively upstream and downstream of the movement of the product and forcibly there circulating and recirculating the gaseous cryogen against the product to respectively pre-cool and temper the product.

References Cited by the Examiner

UNITED STATES PATENTS

| | | | |
|---|---|---|---|
| 2,447,249 | 8/1948 | Hill | 62—65 X |
| 2,959,034 | 11/1960 | Morrison | 62—119 X |
| 3,022,636 | 2/1962 | Morrison | 62—64 |
| 3,114,248 | 12/1963 | Morrison | 62—65 X |
| 3,255,608 | 6/1966 | Macintosh | 62—380 X |
| 3,258,935 | 7/1966 | Ross | 62—64 X |
| 3,277,657 | 10/1966 | Harper, et al. | 62—63 |

ROBERT A. O'LEARY, *Primary Examiner.*

MEYER PERLIN, *Examiner.*

W. E. WAYNER, *Assistant Examiner.*